(12) United States Patent
Allen

(10) Patent No.: US 8,882,112 B2
(45) Date of Patent: Nov. 11, 2014

(54) METHODS AND APPARATUS FOR SEALING AUTOMOTIVE COMPONENT PASS-THROUGHS

(75) Inventor: Todd E. Allen, Lake Orion, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 64 days.

(21) Appl. No.: 13/460,083

(22) Filed: Apr. 30, 2012

(65) Prior Publication Data

US 2013/0285335 A1 Oct. 31, 2013

(51) Int. Cl.
*F16J 15/02* (2006.01)

(52) U.S. Cl.
USPC .............................. 277/637; 277/630; 277/650

(58) Field of Classification Search
USPC .................................. 277/628, 630, 637, 650
See application file for complete search history.

(56) References Cited

U.S. PATENT DOCUMENTS

| | | | | |
|---|---|---|---|---|
| 7,121,557 B2* | 10/2006 | Christie et al. | ............... | 277/606 |
| 8,087,674 B2* | 1/2012 | Cummings | ................... | 277/606 |
| 2003/0178787 A1* | 9/2003 | Christie et al. | ............... | 277/549 |
| 2004/0104539 A1* | 6/2004 | Nakazawa | .................... | 277/637 |
| 2005/0012280 A1* | 1/2005 | Richardson | .................... | 277/628 |
| 2008/0265525 A1* | 10/2008 | Cummings | ................... | 277/606 |

* cited by examiner

*Primary Examiner* — Gilbert Lee
(74) *Attorney, Agent, or Firm* — Ingrassia Fisher & Lorenz, P.C.

(57) ABSTRACT

A sealing apparatus is provided for sealing an automotive component extending between an engine compartment and a passenger compartment of an automobile. The sealing apparatus includes a pass-through mount component configured to house the automotive component. An outer seal component is configured to rigidly mount to a wall structure separating the passenger compartment from the engine compartment and to elastically contact a platform region of one end of the pass-through mount structure. An inner seal component is configured to elastically couple to the outer seal component within the passenger compartment and to elastically couple to one end of the pass-through mount component.

20 Claims, 3 Drawing Sheets

METHODS AND APPARATUS FOR SEALING AUTOMOTIVE COMPONENT PASS-THROUGHS

TECHNICAL FIELD

The present invention generally relates to automotive assembly and, more particularly, to systems and methods for aligning and sealing automotive components.

BACKGROUND

During the assembly of an automobile or other such vehicle, it is often necessary to install components (such as the steering shaft or the like) that extend from the engine compartment to the passenger compartment, usually through a wall opening provided between the two compartments. In such cases, it is desirable to seal any interfaces between the components so that dust, fumes, and other foreign materials do not contaminate the passenger compartment from the engine compartment. While known methods provide for various types of seals between compartments, such methods are unsatisfactory in that they are often unable to accommodate variations in design geometry and/or are difficult to align during assembly.

Accordingly, it is desirable to provide more robust methods for sealing and aligning automotive components in conjunction with their respective pass-throughs. Other desirable features and characteristics of the present invention will become apparent from the subsequent detailed description of the invention and the appended claims, taken in conjunction with the accompanying drawings and this background of the invention.

SUMMARY

In accordance with one embodiment of the present invention, a sealing apparatus for sealing an automotive component extending between an engine compartment and a passenger compartment of an automobile comprises a pass-through mount component configured to house the automotive component, the pass-through mount structure having a first end and a second end; an outer seal component configured to rigidly mount to a wall structure separating the passenger compartment from the engine compartment, and to elastically contact a platform region of the second end of the pass-through mount component; and an inner seal component configured to elastically couple to the outer seal component within the passenger compartment and to elastically couple to the first end of the pass-through mount component.

In accordance with another embodiment, a method for assembling and sealing an automotive component extending through an opening in a wall structure separating an engine compartment and a passenger compartment of an automobile includes providing a pass-through mount component configured to house the automotive component, the pass-through mount structure having a first end and a second end; inserting the automotive component within the pass-through mount component; providing an outer seal component having a compliant base region; providing an elastic inner seal component; inserting the outer seal component into the opening such that the outer seal component rigidly mounts to the wall structure; inserting the pass-through mount component through the outer seal component such that the compliant base region elastically contacts a platform region of the second end of the pass-through mount component; and elastically coupling the elastic inner seal component to the outer seal component within the passenger compartment and elastically coupling the elastic inner seal component to the first end of the pass-through mount structure.

In accordance with another embodiment, a sealing apparatus for sealing a steering shaft extending between an engine compartment and a passenger compartment of an automobile includes a pass-through mount component configured to house the steering shaft, the pass-through mount structure having a first end and a second end; an outer seal component configured to rigidly mount to a wall structure separating the passenger compartment from the engine compartment, the outer seal component having a compliant base configured to elastically contact a platform region of the second end of the pass-through mount structure; and an inner seal component having an elastic membrane body, an inner elastic ring, and an outer elastic ring, wherein the inner elastic ring is configured to compressively couple to the first end of the pass-through mount structure, and the outer elastic ring is configured to compressively couple to the outer seal component.

DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Further, there is no intention to be bound by any theory presented in any part of this document. For the sake of brevity, conventional techniques related to automotive structures, assembly, and the like may not be described in detail herein. Furthermore, the terms "automobile" and "automotive" are used herein without loss of generality, and also comprehend trucks and other such vehicles.

Figure 1:
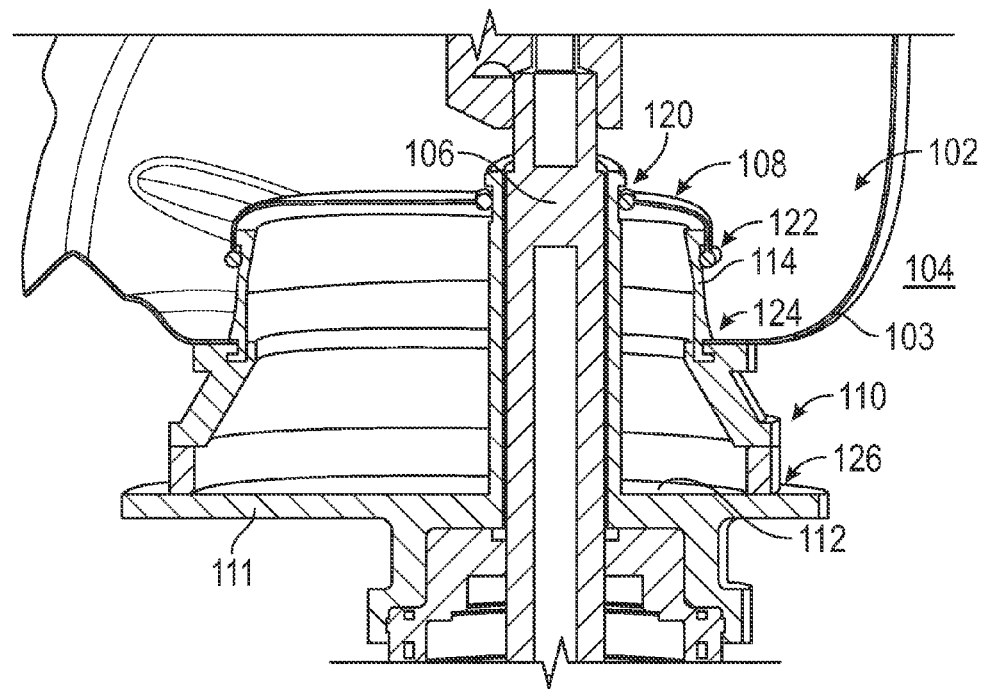
FIG. 1 is a cross-sectional view depicting a seal assembling in accordance with one embodiment.

Referring now to FIG. 1, a sealing apparatus in accordance with various embodiment of the present invention is generally adapted to seal and/or assist with alignment of an automotive component 106 (for example, a steering shaft) that extends between an engine compartment 104 and a passenger compartment 102 of an automobile. In many embodiments, the two compartments 102 and 104 are separated by a wall structure 103, which may have a relatively constant thickness (as illustrated), or may vary in thickness or have any other suitable structure conventionally used as wall structures in automobiles. In this regard, while an automobile is not explicitly illustrated in the drawings, those of ordinary skill in the art will understand the common meanings of the terms "engine compartment" and "passenger compartment" as they relate to automobiles.

In the illustrated embodiment, sealing apparatus includes three interconnected components: a pass-through mount component (or simply "mount component") 111, an inner seal component 108, and an outer seal component 110.

Mount component 111 is configured to house an automotive component 106. That is, mount component 111 is configured to support and/or partially contain automotive component 106. In some embodiments, mount component 111 is a generally hollow (e.g., tube-like) structure configured to slideably accept automotive component 106 through one or more of its ends. Mount component 111 may have a variety of shapes, but is generally used to assist automotive component 106 in "passing through" wall 103.

Inner seal component 108 is configured to elastically couple to outer seal component 110 within passenger compartment 102 and to elastically couple to one end of pass-through mount component 111. In this way, passenger compartment 102 is effectively sealed from engine compartment 104 via inner seal component 108 and the rigid connection of outer seal component 110 to wall 103. At the same time, the elastic and deformable nature of inner seal component 108 allows it to robustly adjust to variations in geometry and movement during alignment.

Figure 2:
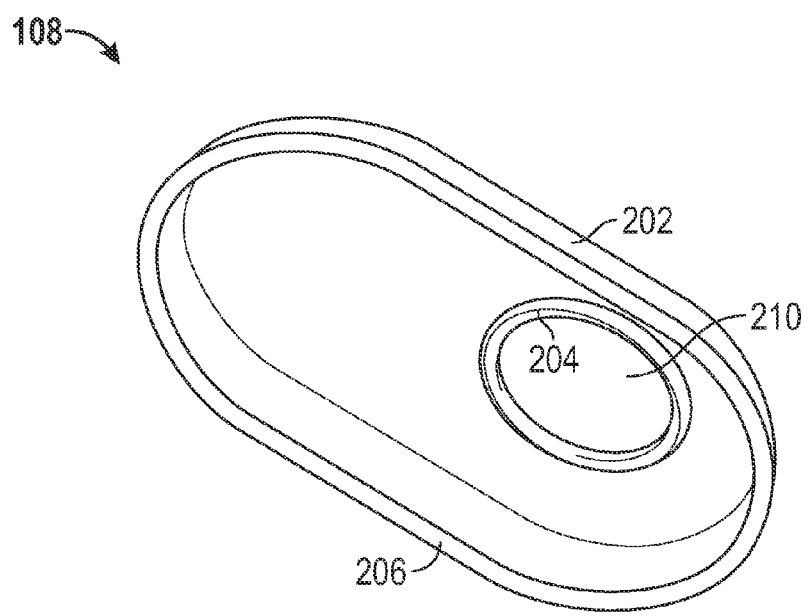
FIGS. 2 and 3 depict isometric and side-views, respectively, of an inner seal component in accordance with one embodiment.
Figure 3:
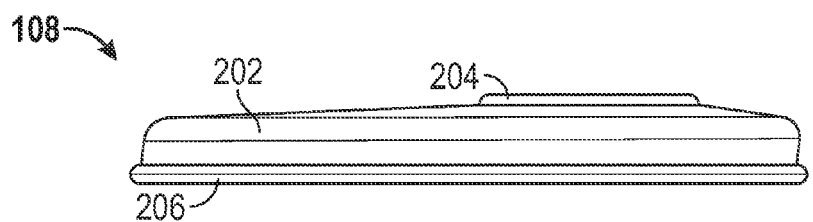

In a particular embodiment, referring now to FIGS. 2 and 3 in conjunction with FIG. 1, inner seal component 108 comprises an elastic membrane body 202 having an inner elastic ring 204 configured to compressively couple to one end of pass-through mount component 111, and an outer elastic ring 206 configured to compressively couple to the outer seal component 110. Elastic rings 204 and 206 may have any suitable shape and cross-section. In one embodiment, for example, elastic rings 204 and 206 are generally circular rings having a radius that is about twice the thickness of elastic membrane body 202. In one embodiment, for example, rings 204 and 206 have a thickness of about 1.0-3.0 mm, and body 202 has a thickness of about 0.1-0.5 mm.

Elastic rings 204 and 206 may comprise any suitable material or combination of materials. In one embodiment, elastic membrane body and elastic rings 204 and 206 are contiguous and comprise a polymeric material such as Latex or rubber. In one embodiment, the size, shape, and material for elastic membrane body 202 is selected to accommodate greater than about 10.0 mm of build clearance (e.g., lateral movement of automotive component 106) during insertion of pass-through mount component 111.

Figure 6:
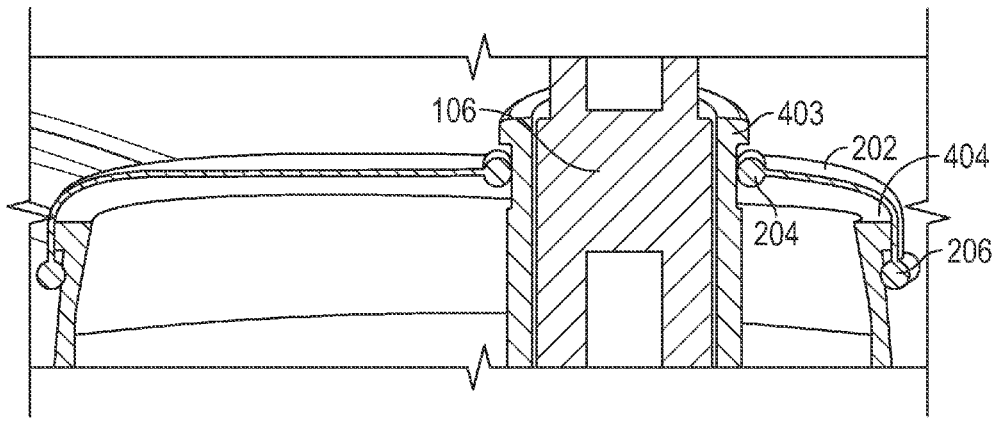
FIG. 6 is a cross-sectional close-up of an inner seal component installed in accordance with one embodiment.

Referring to FIG. 6, the inner elastic ring 204 may be configured to compressively couple to a region adjacent to a lip 403 provided at the end of pass-through mount component 111. Similarly, outer elastic ring 206 may be configured to compressively couple to a region adjacent to a lip provided on the outer seal component 110. In this way, elastic rings 204 and 206 are retained such that they are resistant to axial movement of the various components.

Figure 4:
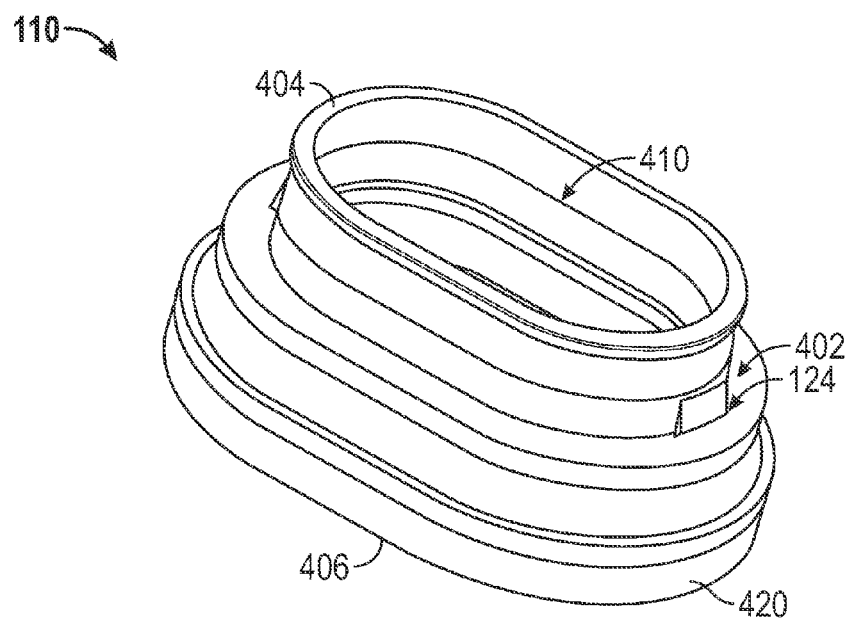
FIGS. 4 and 5 depict isometric and side-views, respectively, of an outer seal component in accordance with one embodiment.
Figure 5:
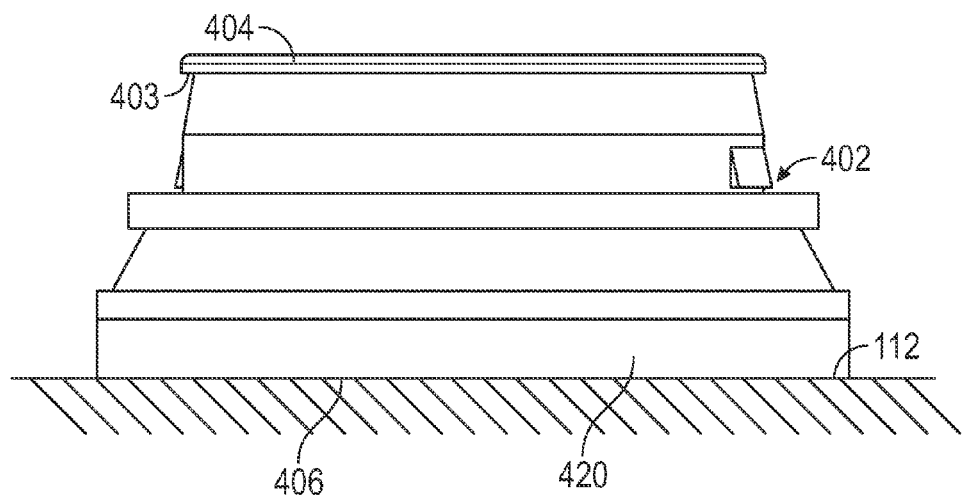

Referring again to FIG. 1, outer seal component 110 is generally configured to rigidly mount to wall structure 103 and to elastically contact (e.g., at 126) a platform region 112 of pass-through mount component 111. Outer seal component 110 thus acts as a "docking station" with respect to wall 103 and mount component 111. In one embodiment, as depicted in FIGS. 4 and 5, outer seal component 110 has a top surface 404, a bottom surface 406, and an opening 410 therethrough. Outer seal component 110 features a compliant base region 420, such that surface 406 is configured to elastically contact platform region 112. That is, compliant base region 420 deforms elastically to conform to variations in geometry and/or orientation of platform region 112. In this way, the marriage process (i.e., the joining of platform region 112 to compliant base region 420) is decoupled from seal performance. In a particular embodiment, compliant base region 420 comprises a foam material, such as an Ethylene propylene diene monomer (EPDM) rubber. Outer seal component may be manufacturing via over-molding of one or more plastics, or using a variety of other conventional techniques. The shape of outer seal component 110 may vary depending upon its application.

Figure 7:
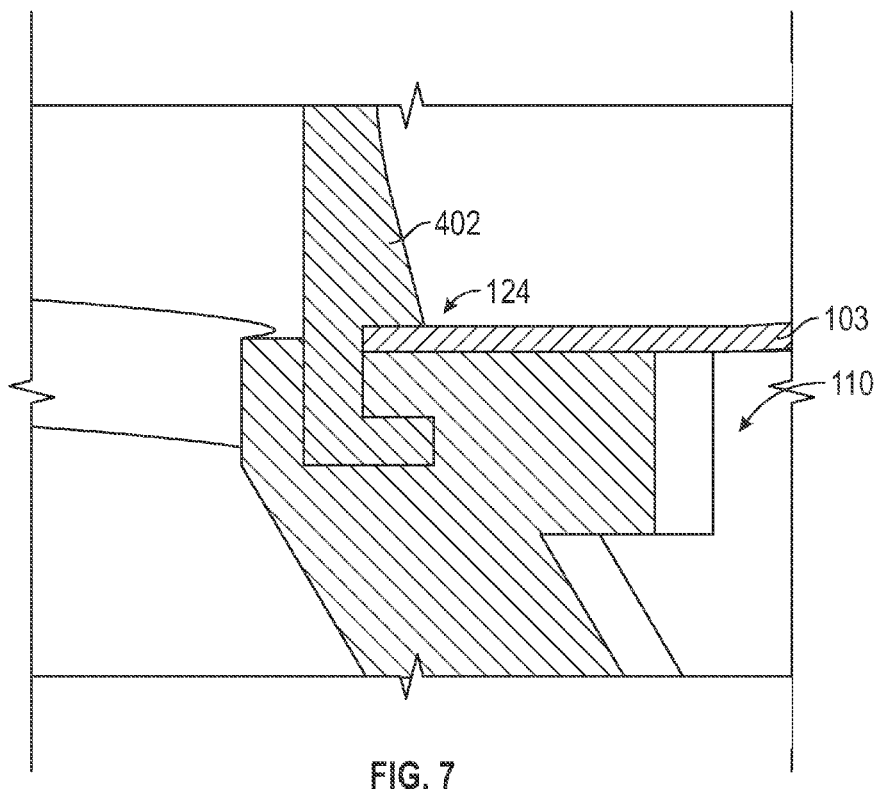
FIG. 7 is a cross-sectional close-up depicting mounting of an outer seal component in accordance with one embodiment.

Outer seal component 110 may be configured in a variety of ways to rigidly mount (e.g., at 124) to wall structure 103. Referring to FIG. 7, for example, outer seal component 110 may include an integral locking tab 402. Thus, when outer seal component 110 is inserted within an opening in wall 103 (vertically upward in FIG. 7), the sloped outer surface of locking tab 402 slides against the inner edge of the opening until it locks in place, effectively sandwiching wall 103 between tab 402 and the body of outer seal component 110. Other fastening techniques, such as adhesives, screws, rivets, or any other suitable fastener may be employed.

Referring once more to FIG. 1, a variety of methods may be used for assembling the illustrated structure. In one embodiment, the automotive component 106 is first inserted (e.g., axially) within pass-through mount component 111. Alternatively, depending upon the nature of the components, automotive component 106 may be inserted at the end of the assembly process (i.e., after pass-through mount component 111 is firmly in place).

The outer seal component 110 is inserted into the opening of wall structure 103 such that the outer seal component 110 rigidly mounts to wall structure 103. Next, pass-through mount component 111 is inserted through outer seal component 110 such that the compliant base region elastically contacts platform region 112. Once the components are aligned, the elastic inner seal component 108 is elastically coupled (e.g., stretched over) the end of outer seal component 110 and well as the end of pass-through mount structure 111.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A sealing apparatus for sealing an automotive component extending between an engine compartment and a passenger compartment of an automobile, the sealing apparatus comprising:
   a pass-through mount component configured to house the automotive component, the pass-through mount component having a first end and a second end;
   an outer seal component configured to rigidly mount to a wall structure separating the passenger compartment from the engine compartment, and to elastically contact a platform region of the second end of the pass-through mount structure; and
   an inner seal component configured to elastically couple to the outer seal component within the passenger compartment and to elastically couple to the first end of the pass-through mount component such that the outer seal component, the inner seal component, and the pass-through mount component are substantially coaxial.

2. The sealing apparatus of claim 1, wherein the inner seal component comprises an elastic membrane body having an inner elastic ring configured to compressively couple to the first end of the pass-through mount component, and an outer elastic ring configured to compressively couple to the outer seal component.

3. The sealing apparatus of claim 2, wherein the elastic membrane body comprises a polymeric material.

4. The sealing apparatus of claim 1, wherein the pass-through mount component is configured to house a steering shaft.

5. The sealing apparatus of claim 1, wherein the outer seal component includes a compliant base region configured to contact the platform region.

6. The sealing apparatus of claim 5, wherein the compliant base region comprises a foam material.

7. The sealing apparatus of claim 1, wherein the outer seal component is configured to rigidly mount to the wall structure via an integral locking tab.

8. The sealing apparatus of claim 1, wherein the outer seal component is rigidly mounted to the wall structure via an integral locking tab.

9. A method for assembling and sealing an automotive component extending through an opening in a wall structure separating an engine compartment and a passenger compartment of an automobile, the method comprising:
providing a pass-through mount component configured to house the automotive component, the pass-through mount structure having a first end and a second end;
inserting the automotive component within the pass-through mount component;
providing an outer seal component having a compliant base region;
providing an elastic inner seal component;
inserting the outer seal component into the opening such that the outer seal component rigidly mounts to the wall structure;
inserting the pass-through mount component through the outer seal component such that the compliant base region elastically contacts a platform region of the second end of the pass-through mount component; and
elastically coupling the elastic inner seal component to the outer seal component within the passenger compartment and elastically coupling the elastic inner seal component to the first end of the pass-through mount structure such that the outer seal component, the inner seal component, and the pass-through mount component are substantially coaxial.

10. The method of claim 9, wherein the inner seal component comprises an elastic membrane body having an inner elastic ring configured to compressively couple to the first end of the pass-through mount structure, and an outer elastic ring configured to compressively couple to the outer seal component.

11. The method of claim 10, wherein the elastic membrane body comprises a polymeric material.

12. The method of claim 9, wherein the pass-through mount component is configured to house a steering shaft.

13. The method of claim 9, wherein the compliant base region comprises a foam material.

14. A sealing apparatus for sealing a steering shaft extending between an engine compartment and a passenger compartment of an automobile, the sealing apparatus comprising:
a pass-through mount component configured to house the steering shaft, the pass-through mount component having a first end and a second end;
an outer seal component configured to rigidly mount to a wall structure separating the passenger compartment from the engine compartment, the outer seal component having a compliant base configured to elastically contact a platform region of the second end of the pass-through mount component; and
an inner seal component having an elastic membrane body, an inner elastic ring, and an outer elastic ring, wherein the inner elastic ring is configured to compressively couple to the first end of the pass-through mount component, and the outer elastic ring is configured to compressively couple to the outer seal component; and
wherein the outer seal component, the inner seal component, and the pass-through mount component are substantially coaxial.

15. The sealing apparatus of claim 14, wherein the elastic membrane body comprises a polymeric material.

16. The sealing apparatus of claim 14, wherein the compliant base region comprises a foam material.

17. The sealing apparatus of claim 14, wherein the outer seal component is configured to rigidly mount to the wall structure via an integral locking tab.

18. The sealing apparatus of claim 14, wherein the elastic membrane body of the inner seal component is adapted to accommodate greater than 10 mm of build clearance during insertion of the pass-through mount component.

19. The sealing apparatus of claim 14, wherein the inner elastic ring is configured to compressively couple to a lip provided at the first end of the pass-through mount component.

20. The sealing apparatus of claim 14, wherein the outer elastic ring is configured to compressively couple to a lip provided on the outer seal component.

* * * * *